(12) United States Patent
Vega et al.

(10) Patent No.: US 11,671,439 B2
(45) Date of Patent: Jun. 6, 2023

(54) SYSTEM AND METHOD FOR IMPLEMENTING DIGITAL CLOUD FORENSICS

(71) Applicant: JPMorgan Chase Bank, N.A., New York, NY (US)

(72) Inventors: Michael P. Vega, Pickerington, OH (US); James Regan, Dumont, NJ (US); Matteo Michelini, Stevenage (GB); Jean-Francois Legault, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 61 days.

(21) Appl. No.: 17/343,895

(22) Filed: Jun. 10, 2021

(65) Prior Publication Data
US 2021/0306364 A1    Sep. 30, 2021

Related U.S. Application Data

(63) Continuation of application No. 16/054,379, filed on Aug. 3, 2018, now Pat. No. 11,038,908.

(60) Provisional application No. 62/541,289, filed on Aug. 4, 2017.

(51) Int. Cl.
*H04L 29/06* (2006.01)
*H04L 9/40* (2022.01)
*G06F 21/56* (2013.01)

(52) U.S. Cl.
CPC .......... *H04L 63/1425* (2013.01); *G06F 21/56* (2013.01); *H04L 63/30* (2013.01)

(58) Field of Classification Search
None
See application file for complete search history.

(56) References Cited

U.S. PATENT DOCUMENTS

| | | | |
|---|---|---|---|
| 10,148,493 B1 * | 12/2018 | Ennis, Jr. | ............... H04L 67/10 |
| 10,466,924 B1 | 11/2019 | Newstadt | |
| 11,038,908 B2 * | 6/2021 | Vega | .................. H04L 63/1425 |
| 2014/0074905 A1 | 3/2014 | Schincariol et al. | |
| 2014/0075021 A1 | 3/2014 | Revanuru | |
| 2014/0143868 A1 | 5/2014 | Shiva et al. | |

(Continued)

FOREIGN PATENT DOCUMENTS

CN    104487948    4/2015

OTHER PUBLICATIONS

International Searching Authority, International Search Report and Written Opinion, International Application No. PCT/US2018/045132, dated Dec. 3, 2018, pp. 1-11.

(Continued)

*Primary Examiner* — Benjamin E Lanier
(74) *Attorney, Agent, or Firm* — Greenblum & Bernstein, P.L.C.

(57) ABSTRACT

The invention relates to digital cloud forensics. An embodiment of the present invention applies collection processes and tools to cloud infrastructure as a service to provide a more efficient and faithful representation of evidence. An embodiment of the present invention applies innovative concepts to retrospectively investigate ephemeral instances which may have long since terminated. This innovative process provides organizations a strategy to provide forensic investigations within either a public or private cloud environment.

20 Claims, 10 Drawing Sheets

(56) References Cited

U.S. PATENT DOCUMENTS

| | | |
|---|---|---|
| 2014/0317681 A1 | 10/2014 | Shende |
| 2015/0271208 A1 | 9/2015 | Gallant |
| 2016/0020959 A1 | 1/2016 | Rahaman |
| 2016/0275303 A1 | 9/2016 | Narayanaswamy |
| 2016/0371489 A1 | 12/2016 | Puri et al. |
| 2016/0373476 A1 | 12/2016 | Dell'anno et al. |
| 2017/0264619 A1 | 9/2017 | Narayanaswamy |
| 2018/0027006 A1 | 1/2018 | Zimmermann |
| 2019/0349421 A1 | 11/2019 | Schincariol et al. |

OTHER PUBLICATIONS

International Bureau of WIPO, International Preliminary Report on Patentability and Written Opinion of the International Searching Authority, International Application No. PCT/US2018/045132, dated Feb. 4, 2020, pp. 1-7.

Irfan et al., "A Framework For Cloud Forensics Evidence Collection and Analysis Using Security Information and Event Management", 2016, Wiley Online Library, pp. 1-18.

Office Action issued by the China National Intellectual Property, Administration (CNIPA) in Chinese Patent Application No. 201880061823.1, dated Mar. 16, 2023, together with an English language translation.

* cited by examiner

SYSTEM AND METHOD FOR IMPLEMENTING DIGITAL CLOUD FORENSICS

CROSS REFERENCE TO RELATED APPLICATIONS

This application is a continuation of U.S. Utility patent application Ser. No. 16/054,379, filed on Aug. 3, 2018, which claims priority to U.S. Provisional Application 62/541,289, filed Aug. 4, 2017, the contents of which are incorporated by reference herein in its entirety.

FIELD OF THE INVENTION

The invention relates generally to a system and method for implementing digital cloud forensics.

BACKGROUND OF THE INVENTION

As infrastructure and platforms move from legacy locations to cloud hosted environments, information exposure risk can potentially increase while traditional forensic investigative methodologies are no longer relevant. Relying on hosted or third party services may not be feasible or desirable based upon service level agreements and data confidentiality. Organizations may not be ready or have a solution in place to provide forensic investigative support for the incident response lifecycle.

These and other drawbacks exist.

SUMMARY OF THE INVENTION

According to one embodiment, the invention relates to a system that implements digital cloud forensics. The system comprises: an object storage component; a computer processor, coupled to the object storage component, that is configured to execute: an orchestration layer that executes logic to implement a plurality of forensic processing stages; and an acquisition microservice that interfaces between the logic executed on the orchestration layer and a cloud platform and further acquires forensic artifacts based on the logic executing on the orchestration layer; a forensic data processor that processes data acquired from the acquisition microservice into datasets that are used as an input to a data classification and initial triage component; and an analysis processor that applies data mining and classification algorithms to identify anomalies in the datasets.

According to an embodiment of the present invention, a method comprises the steps of: executing logic, via an orchestration layer, to implement a plurality of forensic processing stages; acquiring, via an acquisition microservice that interfaces between the logic executed on the orchestration layer and a cloud platform, forensic artifacts based on the logic executing on the orchestration layer; processing, via a forensic data processor, data acquired from the acquisition microservice into datasets that are used as an input to a data classification and initial triage component; and applying, an analysis processor, data mining and classification algorithms to identify anomalies in the datasets.

According to an embodiment of the present invention, the system comprises: a central data repository that stores and maintains data; an interactive user interface that receives an input; and a processor, coupled to the memory component and the interactive interface, configured to perform the steps comprising: identifying a host operating system and an application architecture; updating a set of forensic tools in a local repository; creating a forensic Virtual Private Cloud (VPC); deploying one or more pre-staged tools to object storage; and creating an encrypted volume to store the set of forensic tools.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. An embodiment of the present invention provides improvements over traditional digital forensic capabilities in that the innovative process accounts for infrastructure and platforms which are provided by a third party as a service and takes into account characteristics which are native to the cloud such as elastic and ephemeral instances. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention applies collection processes and tools to cloud infrastructure as a service to provide a more efficient and faithful representation of evidence. An embodiment of the present invention applies innovative concepts to retrospectively investigate ephemeral instances which may have long since terminated. This process provides organizations a strategy to support forensic investigations within a public or private cloud environment.

An embodiment of the present invention provides investigation of virtualized physical infrastructure along with an accounting for cloud properties of ephemeral and elastic compute instances. The method and system of an embodiment of the present invention may further account for investigations into an underlying infrastructure hypervisor, licensing of proprietary tools through a wide area network and ingestion of the output of forensic investigations while in the cloud environment to scope further investigations.

Figure 3:
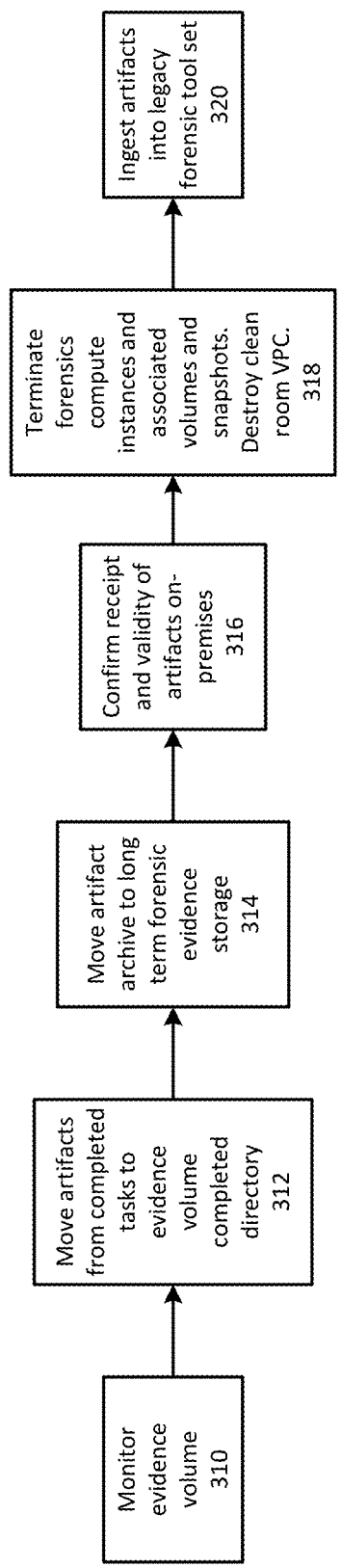
FIG. 3 is an exemplary flow diagram that illustrates data movement, according to an embodiment of the present invention.
Figure 4:
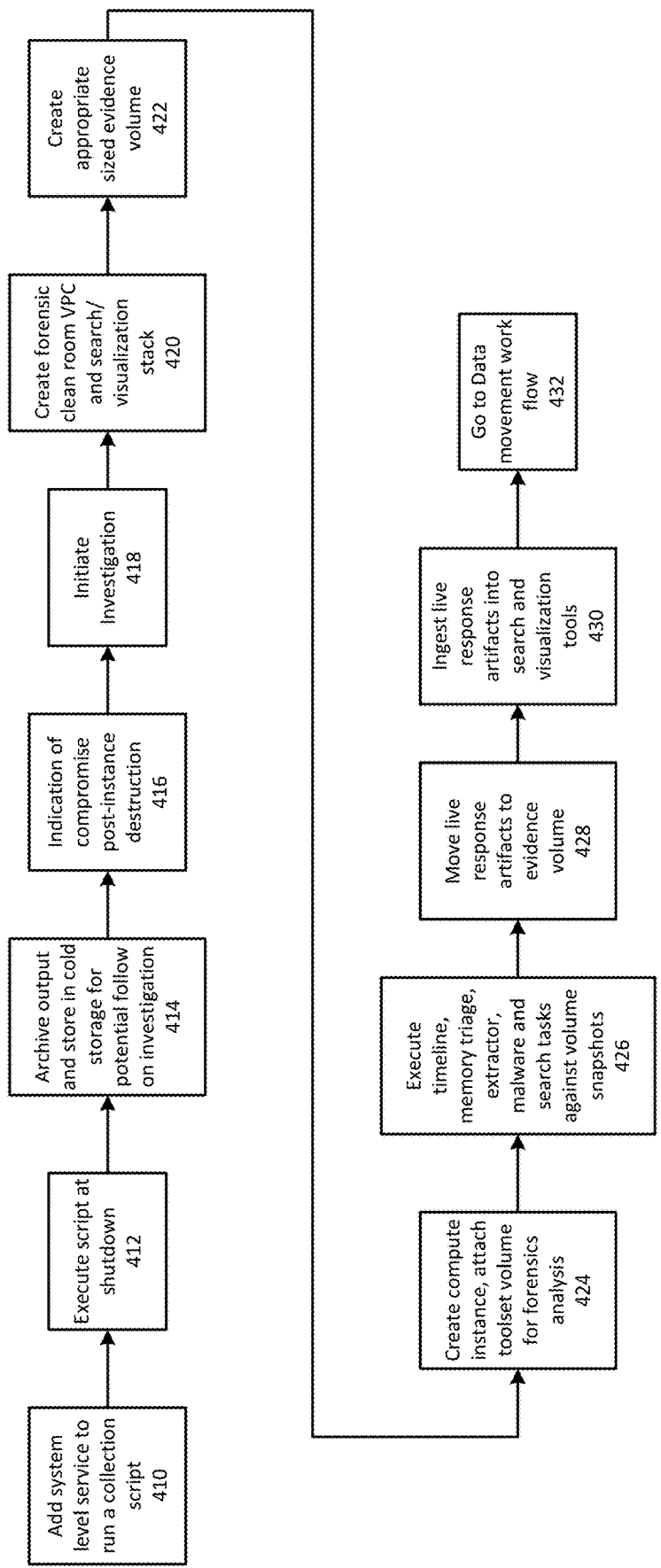
FIG. 4 is an exemplary flow diagram that illustrates instance shutdown process, according to an embodiment of the present invention.

An embodiment of the present invention may involve various stages, including a data preparation stage (FIG. 1); identification and initial response stage (FIG. 2); data movement (FIG. 3) and an instance shutdown process (FIG. 4).

The data preparation stage identifies a current environment (e.g., operating system, host computer, etc.) for staging a cloud environment. Identification and initial response stage may refer to identifying an event (from a third party notification, for example) and providing a response to the event. For example, an event may include an alert or trigger that relates to malware identification, behavioral data, potentially exploited code, as well as any action that triggers off a baseline, etc. Other examples may involve a suspicious IP address or other indicator that requires further investigation. Data movement refers to how data instances are moved to/from legacy tools. For example, cloud native tools may be used to move information, evidence, etc. The instance shutdown process refers to collecting information as certain instances may shutdown and then storing the information. Also, the shutdown process may lead into a data movement process in order to move artifacts back to legacy and other tools.

Figure 1:
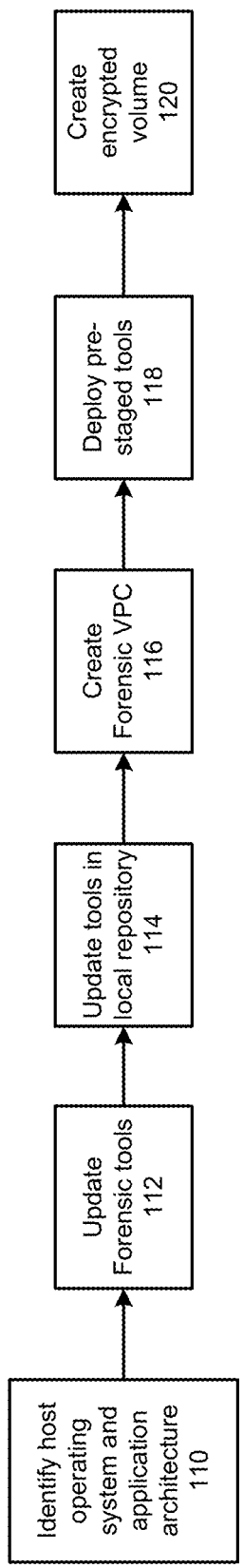
FIG. 1 is an exemplary flow diagram that illustrates data preparation, according to an embodiment of the present invention.

FIG. 1 is an exemplary flow diagram that illustrates data preparation, according to an embodiment of the present invention. Data preparation may refer to performing a pre-work process and then staging a cloud environment. For example, data preparation may perform a preliminary analysis of an environment. This may involve identifying a type of operating system that hosts a cloud environment, identifying and staging various tools and then further isolating the tools. At step 110, a system of an embodiment of the present invention may identify a host operating system and application architecture. At step 112, the system may update Forensic tools as necessary such as memory acquisition module and live response scripts. At step 114, the system may update tools in a local repository. At step 116, the system creates Forensic Virtual Private Cloud (VPC). VPC provides separate forensic investigate operations from normal business operations so that digital forensic work will not impede on normal operations and potential compromised business operations would not undermine forensic operations. VPC represents a common cloud computing concept that sets up a forensic "clean room" to conduct work in a cloud environment that is not compromised by a potential adversary. An embodiment of the present invention may use a VPC to conduct investigations outside a potential compromised environment. At step 118, the system deploys pre-staged tools to an object storage via a cloud software deployment tool. At step 120, the system creates encrypted volume, to store a forensic toolset of live response scripts and triage tools from an object storage. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Figure 2:
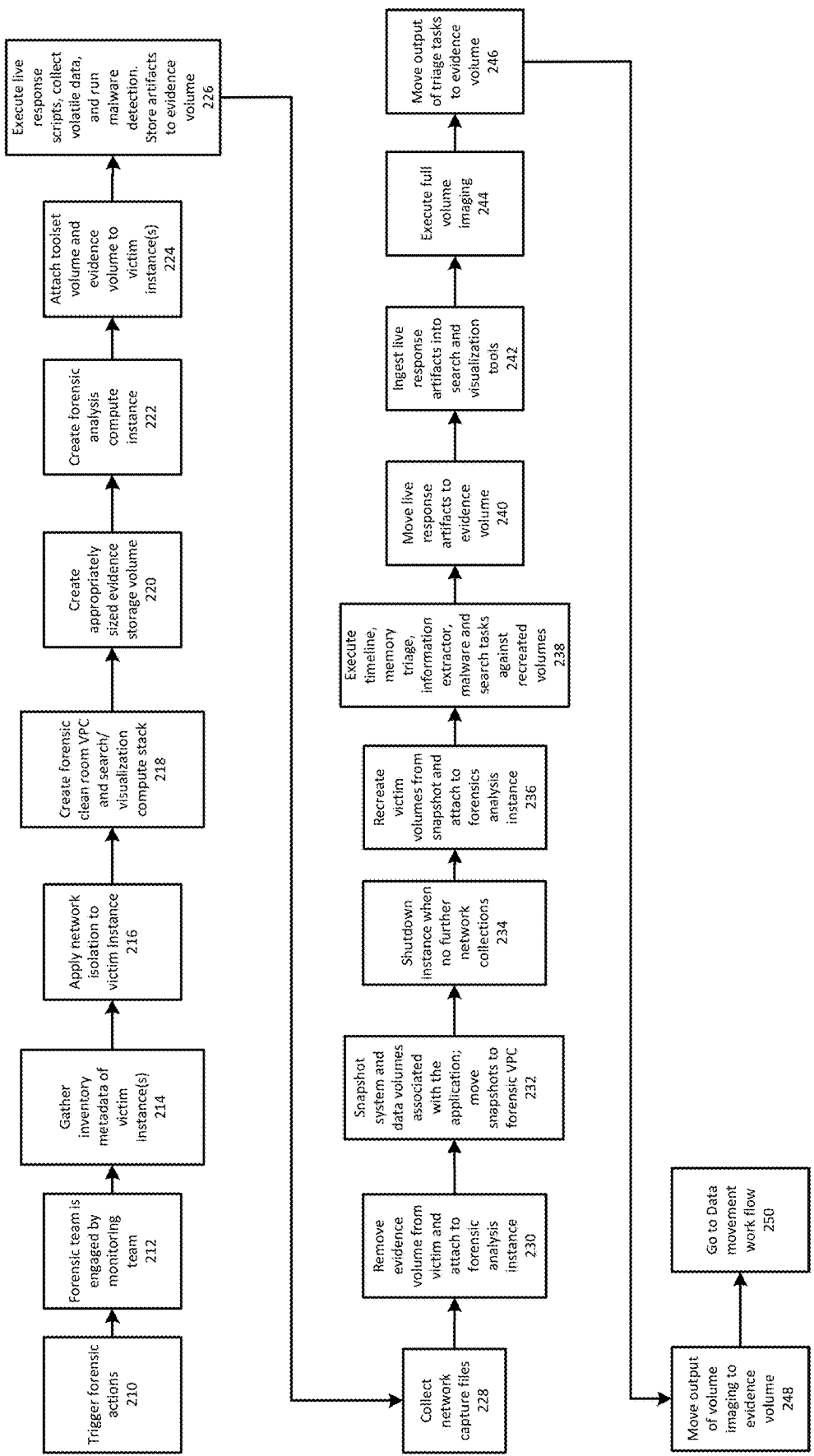
FIG. 2 is an exemplary flow diagram that illustrates identification and initial response, according to an embodiment of the present invention.

FIG. 2 is an exemplary flow diagram that illustrates identification and initial response, according to an embodiment of the present invention. The identification and initial response may refer to identifying an actual event or incident where the event or incident comes from system monitoring, a notification and/or other source of data. The notification may represent an alert or trigger and may be from an external source or a third party. The notification may refer to malware, a behavioral condition, off baseline occurrence, etc. The identification and initial response may further involve isolating an incident and then acquiring data, such as ephemeral data and/or volatile data, from a persistent storage. The data may then be moved into a separate isolated environment, e.g., a forensic clean room for initial triage tasks, requirements analysis, acquisitions and other processing. The data may then be digested into various tools, which may provide a timeline, visualization features and options. This may further shorten lead time in addressing requirements. In addition, in the identification and initial response phase, the system may apply risk based decisioning. For example, the system may receive an alert and determine a low level of confidence in the alert. In response, the system may then determine not to isolate the instance to avoid customer or user impact. Other variations, considerations and decisioning may be applied.

At step 210, an alert from logging and monitoring triggers forensic actions. At step 212, a Forensic team is engaged by a monitoring team. At step 214, the system gathers inventory metadata of victim instance(s) (e.g., instance names, volume identifiers, memory and volume sizes, etc.). At step 216, through a control plane API, the system applies network isolation to a victim instance. At step 218, the system uses cloud infrastructure service API to create a forensic clean room VPC and search/visualization compute stack. At step 220, through control plane API, the system creates appropriately sized evidence storage volume. At step 222, through control plane API, the system creates forensic analysis compute instance. At step 224, through control plane API, the system attaches toolset volume and evidence volume to victim instance(s). At step 226, through an automation engine, the system executes live response scripts stored on an application volume to image memory, collecting volatile data, and run malware detection, and further stores artifacts to evidence volume. At step 228, through the automation engine, the system uses a network collection tool stored on tools volume to start collecting network capture files and further move chunks of packet captures to encrypted object storage through control plane API. At step 230, through control plane API, the system removes evidence volume from the victim instance and attaches to a forensic analysis instance. At step 232, through control plane API, snapshot system and data volumes associated with the application and move the snapshots to a forensic VPC. At step 234, through control plane API, a shutdown instance may be executed when no further network collections no longer provide intelligence value. At step 236, through control plane API, the system recreates all victim volumes from snapshot and attach to forensics analysis instance. At step 238, through the automation engine, the system executes timeline, memory triage, information extractor, malware and search tasks against recreated volumes. At step 240, through the automation engine, the system moves live response artifacts to evidence volume. At step 242, through data collector, the system ingests live response artifacts into search and visualization tools. At step 244, through the automation engine, the system executes full volume imaging. At step 246, through the automation engine, the system moves output of triage tasks to evidence volume. At step 248, through the automation engine, the system may move output of volume imaging to evidence volume. At step 250, the flowchart may proceed to FIG. 3. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

FIG. 3 is an exemplary flow diagram that illustrates data movement, according to an embodiment of the present invention. Data movement may refer to moving or transferring data instances into legacy tools. For example, the data may be moved back or more control may be provided to how the data is moved. At step 310, forensic analysis host instances may be preconfigured for data collector to monitor an evidence volume completed directory. At step 312, through automation engine, the system moves artifacts from completed tasks to the evidence volume completed directory. At step 314, through a data collector, the system moves an artifact archive to long term forensic evidence storage. At step 316, the system confirms receipt and validity of artifacts on-premises. At step 318, through control plane API, the system terminates forensics compute instances and associated volumes and snapshots and further destroys clean room VPC. At step 320, the system ingests artifacts into legacy forensic tool set. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

FIG. 4 is an exemplary flow diagram that illustrates instance shutdown process, according to an embodiment of the present invention. For example, the instance shutdown process may be applied to instances in a cloud environment that are ephemeral. This may refer to instances that can be protectively collected as such instances may be shut down and then stored elsewhere. Accordingly, a shutdown process may lead to a data movement process because such artifacts may need to be ingested into certain legacy tools. Such tools may include triage tasks, visualization tasks, cloud native tools, etc. At step 410, in base O/S build, the system adds system level service to run a collection script (similar to live response script). At step 412, the system executes script at shutdown. At step 414, through data collector, the system archives an output and stores in cold storage for a predetermined period of time (e.g., 13 months) for potential follow on investigation. At step 416, the system recognizes an indication of compromise post-instance destruction. At step 418, the system initiates an investigation. At step 420, the system uses cloud infrastructure service API to create forensic clean room VPC and search/visualization stack. At step 422, through control plane API, the system creates appropriate sized evidence volume. At step 424, through control plane, the system creates compute instance, attach toolset volume for forensics analysis. At step 426, through an automation engine, the system executes timeline, memory triage, extractor, malware and search tasks against volume snapshots. At step 428, through the automation engine, the system moves live response artifacts to evidence volume. At step 430, the system ingests live response artifacts into search and visualization tools. At step 432, the system may proceed to FIG. 3. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

Figure 5:
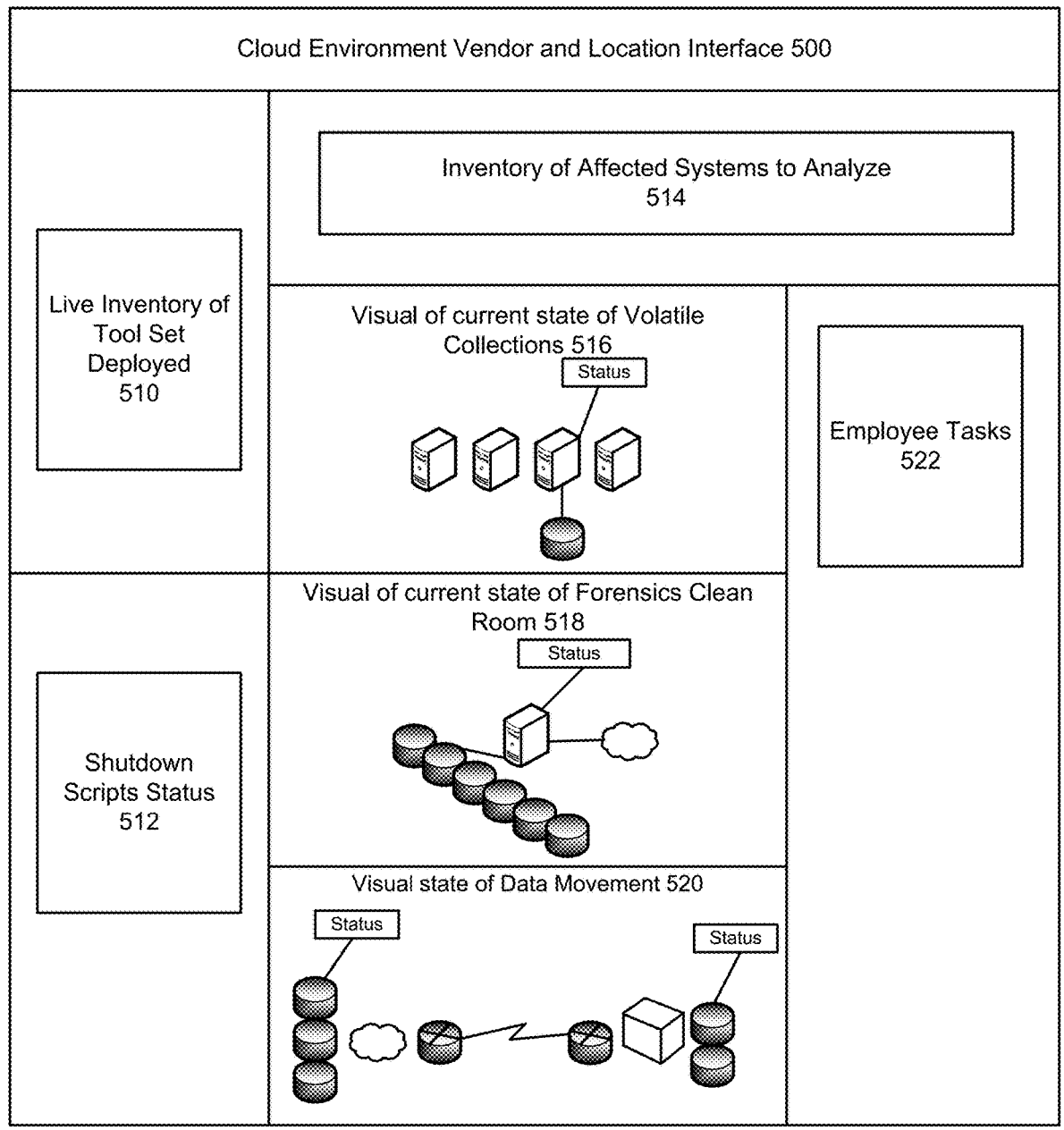
FIG. 5 is an exemplary illustration of a user interface, according to an embodiment of the present invention.

FIG. 5 is an exemplary illustration of a user interface, according to an embodiment of the present invention. FIG. 5 illustrates a cloud environment vendor and location interface 500. For example, Section 510 provides live inventory of tool set deployed. This may include memory module, acquisition scripts version and triage scripts version. Section 512 provides shutdown scripts status. This may include execution on instances, last date stored in quick access and last date stored in slow access storage. Section 514 provides an inventory of affected systems to analyze. This information may be parsed from a collection of scripts. For example, cloud instances and actions requested may be provided. Section 516 provides a visual of a current state of volatile collections. For example, status may include "memory module inserted." Section 518 provides a visual of a current state of forensics clean room. Status may include "imaging volume 2." Section 520 provides a visual state of data movement. Status may include "volumes to be transferred to evidence storage" and "volumes transferred to evidence storage." Section 522 provides Employee Tasks for individual employees, teams, groups, etc. Other information, details and interaction functionality may be provided.

Figure 6:
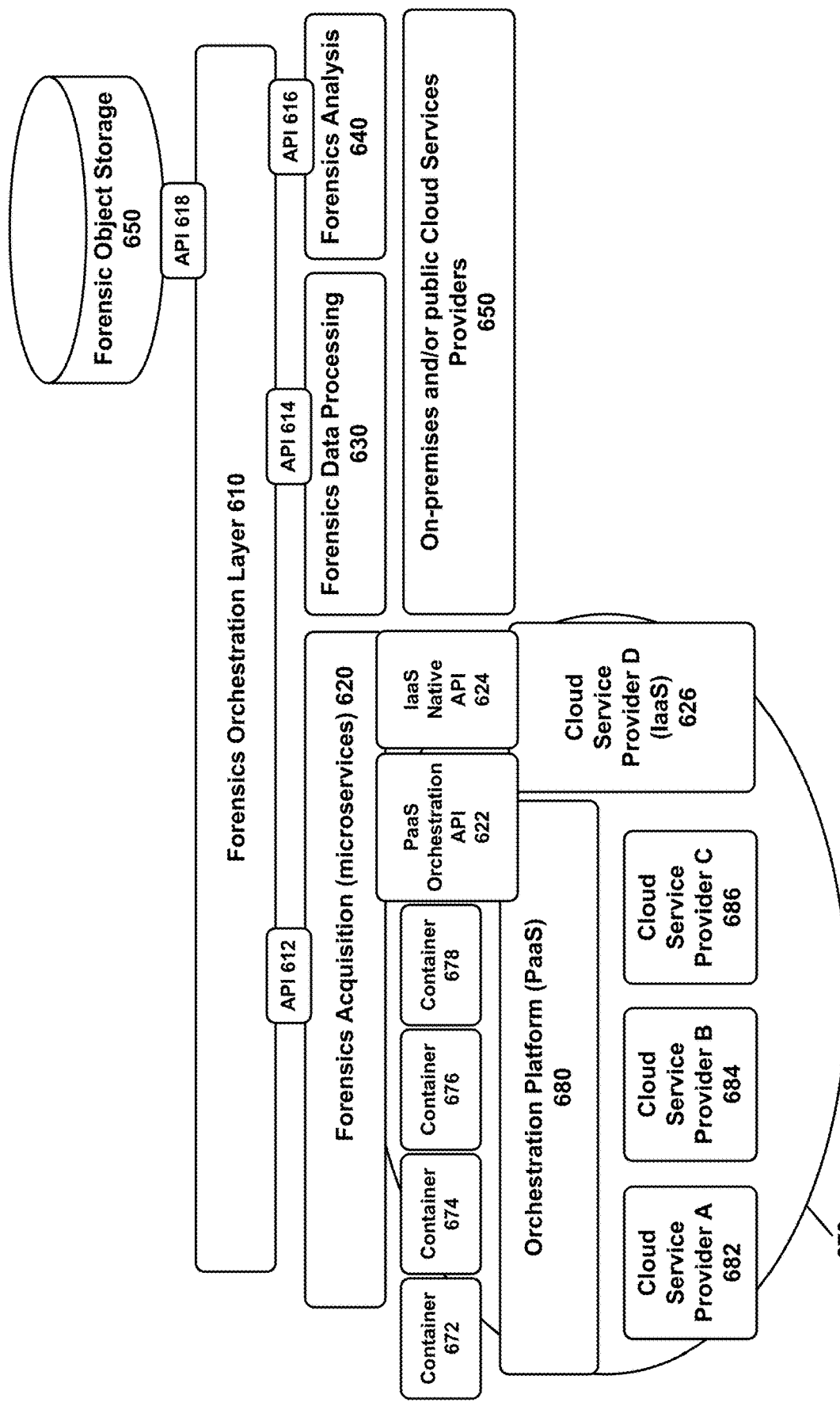
FIG. 6 is an exemplary illustration of a system diagram, according to an embodiment of the present invention.

FIG. 6 is an exemplary illustration of a system diagram, according to an embodiment of the present invention. Forensics Orchestration 610 may represent a software layer that abstracts cloud technologies in order to provide a consistent view between on-premises and third party cloud solutions. Forensics Orchestration 510 may also represent forensic logic through a consistent API layer that may be used to implement the different stages of the forensics process including forensics acquisition, data processing, storage and automated classification and triage.

Forensics Acquisition 620 may represent a software layer that interacts directly with different cloud technologies and stacks. Forensics Acquisition 520 may use a microservice architecture to ensure scalability and support agile development of new functionalities across multiple cloud service providers. This layer may act as an interface between the logic of the forensics process deployed through an orchestration layer, represented by Forensics Orchestration Layer 610, and technological details of each cloud platform. The microservice architecture exposes atomic functionalities that may be chained together in order to acquire relevant forensics artifacts based on the logic deployed through the orchestration layer, represented by Forensics Orchestration Layer 610. The atomic functionalities may be offered from various platforms, such as Platform as s Service orchestration platform APIs, Native APIs from the Infrastructure as a Service as well as a serverless architecture. According to an embodiment of the present invention, this layer may span across different cloud service providers and different implementations to offer maximum level of flexibility. Moreover, the microservice architecture also allows execution of a Forensic playbook and creation of a Forensics White Box.

A Forensic playbook may refer to an organized unit of scripts that defines work for a server configuration managed by a configuration management tool. The configuration tool automates the configuration of multiple servers by the use of a playbook. The playbook may contain one or multiple plays, each of which define the work to be done for a configuration on a managed server. For example, each play may be created by an administrator with environment-specific parameters for the target machines.

A Forensics White Box may represent a clean virtual machine deployed in the cloud for the purpose of executing specific processes on the system that needs to be acquired and analyzed. For example, a White Box may focus on internal structures or working of an application, as opposed to its functionality. White Box may refer to an internal perspective of the system as well as programming skills.

Forensics Data Processing 630 may represent a forensics orchestration layer that offers a set of APIs to process raw data acquired during a previous stage at scale leveraging computational power of the cloud platform. This speeds up the process of normalizing raw data into an actionable dataset that may be used as an input to automation mechanisms for data classification and initial triage.

Forensics Analysis 640 may represent a cloud-native analysis layer that leverages cloud capabilities to apply data mining and classification algorithms to a normalized dataset. Forensics Analysis 640 may leverage in-house and cloud-based Machine learning toolkits to increase scalability and quickly identify anomalies across big data sets.

Each of the components may communicate and share data through APIs, represented by API 612, API 614, API 616 and API 618. Cloud Production Environment 670 may be distributed across different providers offering various technologies and deployment stacks. As shown in FIG. 6, providers may include cloud service providers, represented by 682, 684, 686 and may also include Cloud Service Provider D (Infrastructure as a Service (IaaS)) 626. In this example, Cloud Production Environment 670 may include Orchestration Platform (PaaS(Platform as a Service)) 680 that supports various components including storage illustrated as Container 672, Container 674, Container 676, Container 678. Cloud Production Environment 670 may further include PaaS Orchestration API 622 and IaaS Native API 624. FIG. 6 is merely exemplary, as other variations and components may be implemented in accordance with the various embodiments of the present invention.

Figure 7:
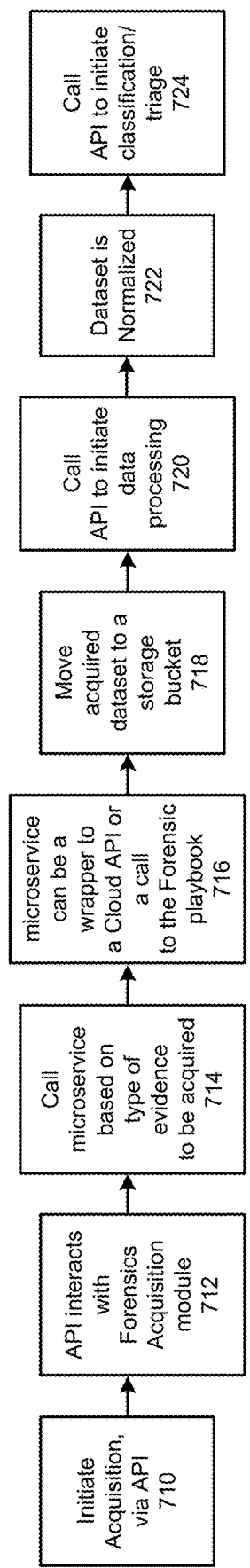
FIG. 7 is an exemplary flow diagram of implementing digital cloud forensics, according to an embodiment of the present invention.

FIG. 7 is an exemplary flow diagram of implementing digital cloud forensics, according to an embodiment of the present invention. At step 710, via an API, an acquisition process may be initiated. This may be initiated at Forensics Orchestration Layer 610 via API 612. At step 712, the API may interact with a Forensic acquisition module. At step 714, a microservice may be called based on the type of evidence to be acquired. The microservice may be called at Forensics Acquisition 620. At step 716, a microservice may be a wrapper to a Cloud API and/or a call to a Forensic playbook, via PaaS orchestration API 622 and/or IaaS Native API 624, respectively. At step 718, an acquired dataset may be moved to a storage, such as a storage bucket, represented by Forensic Object Storage 650 via API 618. At step 720, a call to an API may initiate data processing at Forensics Data Processing 630 via API 614. At step 722, the dataset may be normalized at Forensics Data Processing 630. At step 724, a call to an API may initiate classification, triage and/or other function. This may be provided by Forensics Analysis 640 via API 616. The order illustrated in FIG. 7 is merely exemplary. While the process of FIG. 7 illustrates certain steps performed in a particular order, it should be understood that the embodiments of the present invention may be practiced by adding one or more steps to the processes, omitting steps within the processes and/or altering the order in which one or more steps are performed.

According to an exemplary embodiment, a Forensic playbook may be deployed in a suspicious virtual machine (VM). For example, forensic tools and output volumes may be mounted and Live Response scripts in Forensic volumes may be called. Live Response scripts may be responsible for a memory dump which may be stored in an Output Volume, execution of live evidence scripts, the output may be stored in the Output Volume and running live Malware analysis where the output may be stored in the Output Volume.

A Forensics White Box may include volatility plugins against dumped VM memory, forensics tools executed against VM file system, VM file system acquisition and output sent to a cloud storage service in various different packets, such as live output, memory dump and file system dump.

Figure 8:
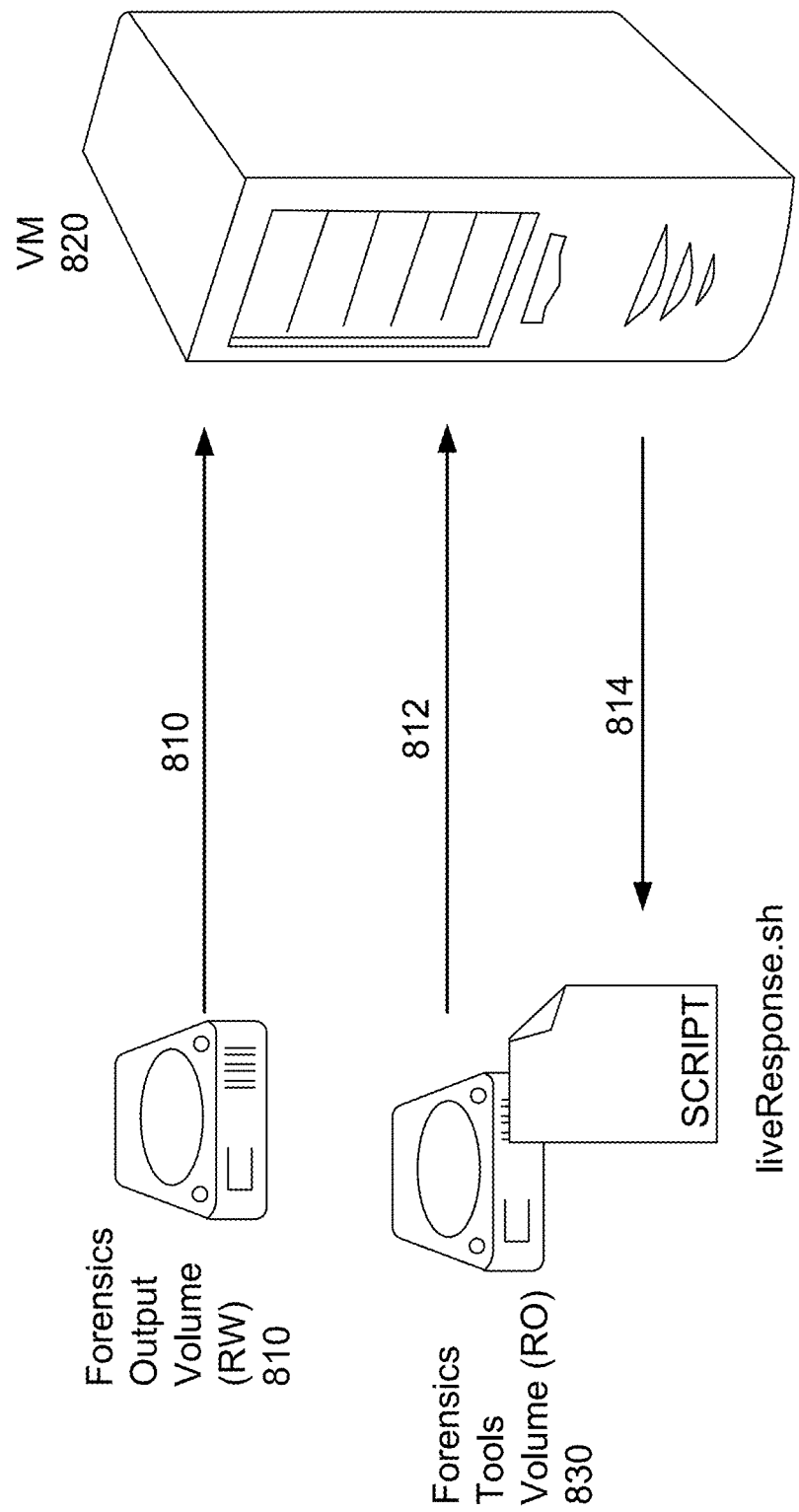
FIG. 8 illustrates an exemplary employment in a virtual machine, according to an embodiment of the present invention.

FIG. 8 illustrates an exemplary employment in a virtual machine, according to an embodiment of the present invention. An incident response may be deployed in the VM 820. For example, a forensics output volume 810 may be attached to the VM 820 and mounted in RW. RW represents read/write permissions to allow data to be written to the volume, as shown by 810. Forensics Tools Volume 830 may be attached to the VM 820 and mounted in RO. RO represents read only permissions to prevent forensics tools being altered by a malicious agent, as shown by 812. Script live response from the Forensics Tools Volume may be executed, as shown by 814. VM 820 may represent a clean virtual machine deployed in the cloud for the purpose of executing specific processes on the system that needs to be acquired and analyzed.

Figure 9:
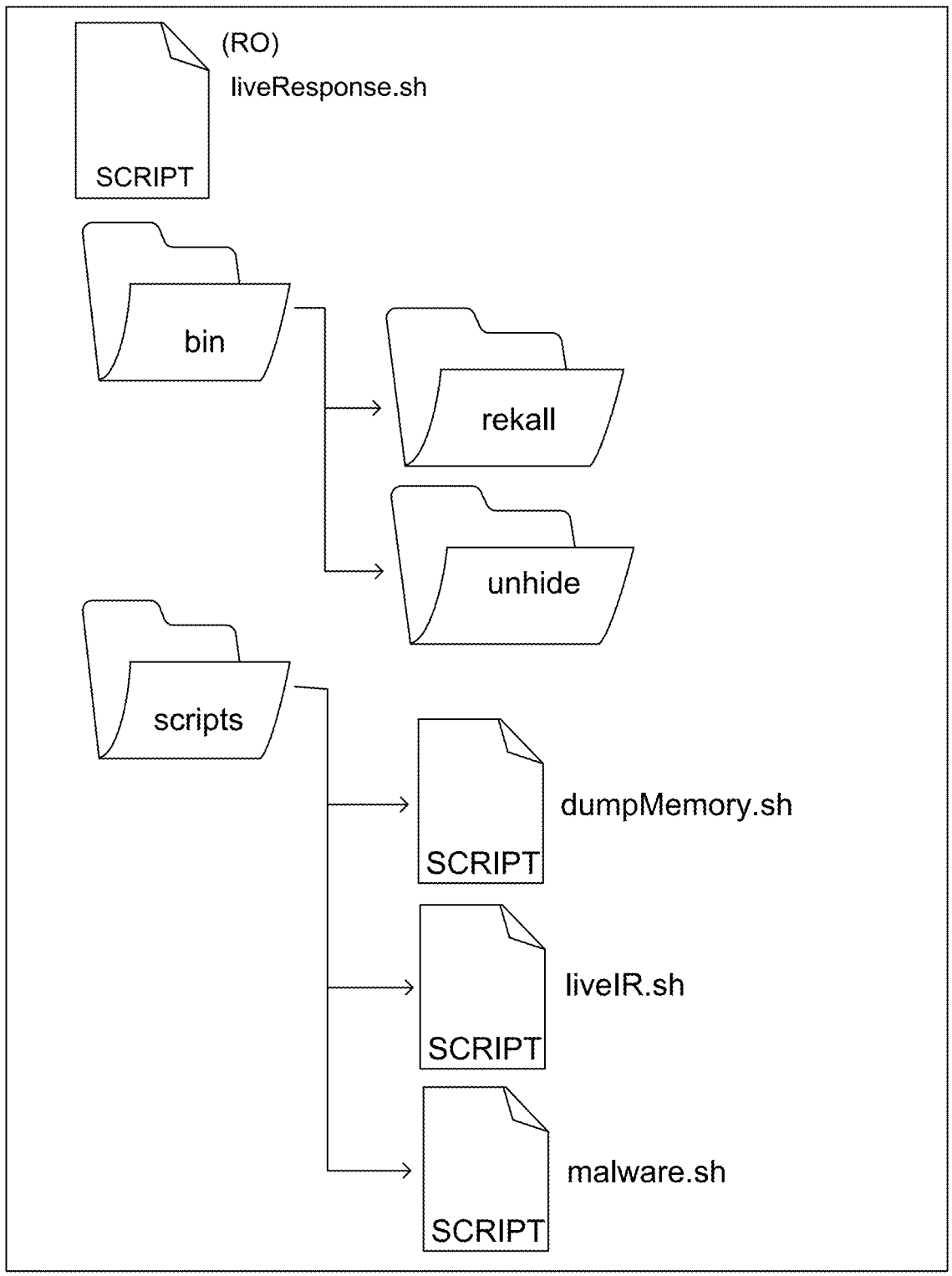
FIG. 9 illustrates an exemplary forensics tools volume, according to an embodiment of the present invention.

FIG. 9 illustrates an exemplary forensics tools volume, according to an embodiment of the present invention. As shown in FIG. 9, a live response script may be executed. Live response may refer to collecting data from a system while it is still running. For example, live response deals with collecting or querying volatile information from a system and executing known good executables to unhide the presence of malicious software. This may be achieved through a set of scripts that implement the logic of an incident response (IR) process and call specific software programs to perform predefined actions. Examples of these tools may include forensic and incident response frameworks and end-to-end solutions for incident responders and forensic analysts, such as unhide, rekall, etc. A memory dump script may be called. A live response script may call a live IR script. Live evidence may be acquired and stored in Output Volume. Main logs may be stored in Output Volume. Live response script may call a malware script. The output may be stored in Output Volume.

Figure 10:
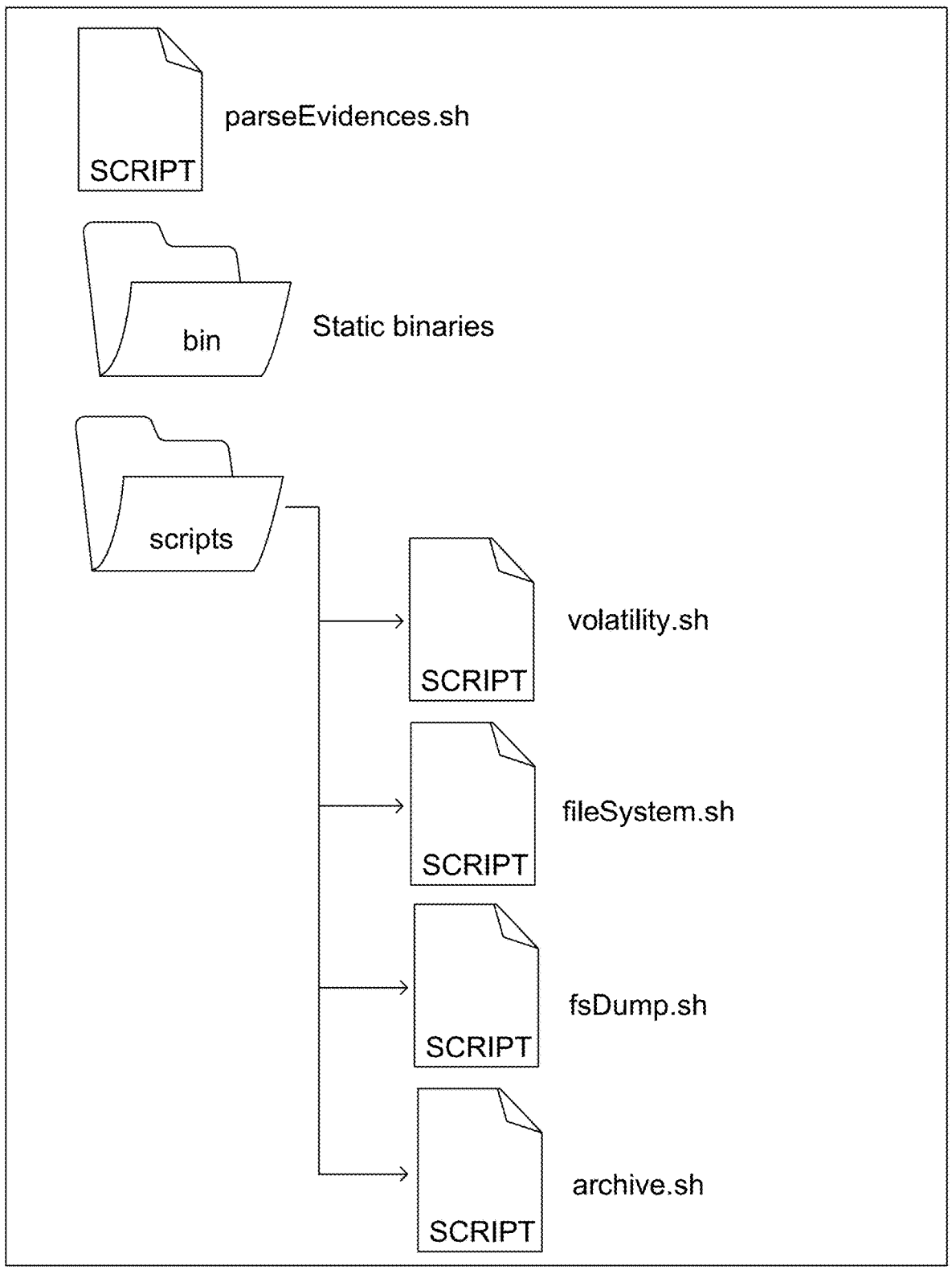
FIG. 10 illustrates an exemplary forensics white box, according to an embodiment of the present invention.

According to an embodiment of the present invention, a forensic whitebox may employ various forensics applications. FIG. 10 illustrates an exemplary forensics white box, according to an embodiment of the present invention. As shown in FIG. 10, a forensics playback may be executed. A parse evidence script may be executed where a forensics output volume and VM file system are attached. The bin folder may contain a set of statically complied software programs that are called by the IR scripts and executed on the system under examination. These programs may be statically linked against libraries on a clean system before they are deployed in the RO volume. This reduces the number of dependencies the software needs to rely upon the system under examination during the execution of the IR scripts limiting the attack surface. A volatility script may be called by the parse evidence script to parse the dumped memory. An archive script may be called to send to a cloud storage service. For example, a first package may include IR and volatility output and a second package may include a memory dump. A file system script may be called by the parse evidence script. And, a file system dump script may be called by the parse evidence script.

An embodiment of the present invention may be directed to movement to an on-premises system. In this scenario, artifacts may be moved to encrypted cloud storage service buckets permissioned for forensics. For example, an output may be moved in order from volatile artifacts (e.g., live response output) to large emulated device images (e.g., full memory and storage captures). Through HTTPS or other encrypted channels, artifacts may be moved from the cloud storage service to forensics evidence storage located on premises.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for providing digital cloud forensics, the system comprising:
    a central data repository that stores and maintains data;
    an interactive user interface that receives an input; and
    a processor, coupled to a memory and the interactive user interface, configured to perform operations, the operations comprising:
        identifying a host operating system and an application architecture;
        updating a set of forensic tools in a local repository, the set of forensic tools including at least one live response script;
        creating a forensic Virtual Private Cloud (VPC);
        deploying the set of forensic tools to an object storage;
        creating an encrypted volume to store the set of forensic tools from the object storage;
        identifying a victim instance;
        attaching a toolset volume, including the live response script, and an evidence volume to the victim instance;
        executing the live response script and storing artifacts to the evidence volume; and
        removing the evidence volume from the victim instance and attaching to a forensic analysis instance.

2. The system of claim 1, wherein the processor is further configured to create the VPC by using a cloud infrastructure service API.

3. The system of claim 1, wherein the operations further comprise:
    receiving an alert for the victim instance from logging and monitoring components;
    gathering inventory metadata of the victim instance, the victim instance associated with the alert;
    applying network isolation to the victim instance;
    using a cloud infrastructure to create a forensic clean room;
    executing the live response script to image memory;
    collecting volatile data and executing malware detection;
    collecting one or more network capture files;
    performing a snapshot of system and data volumes;
    recreating victim volumes from the snapshot; and
    executing timeline, memory triage, information extractor, malware, and search tasks.

4. The system of claim 1, wherein the operations further comprise:
    monitoring the evidence volume;
    transferring the artifacts from completed tasks to an evidence volume completed directory;
    transferring an artifact archive to long term forensic evidence storage;
    terminating forensics compute and instances and associated volumes and snapshots; and
    ingesting artifacts into a legacy forensic tool set.

5. The system of claim 1, wherein the operations further comprise:
    attaching a collection script to the victim instance;
    running the collection script;
    archiving an output for a predetermined period of time;
    recognizing an indication of compromise post-instance destruction; and
    initiating an investigation.

6. The system of claim 5, wherein the operations further comprise:
    creating the evidence volume;
    executing a timeline, a memory triage, an extractor, a malware, and a search task against volume snapshots; and
    moving live response artifacts to the evidence volume.

7. The system of claim 6, wherein the processor is further configured to ingest the live response artifacts into a search and visualization tool.

8. A method for providing digital cloud forensics, the method comprising:
    identifying, via a computer processor, a host operating system and an application architecture;
    updating, via the computer processor, a set of forensic tools in a local repository, the set of forensic tools including at least one live response script;
    creating, via the computer processor, a forensic Virtual Private Cloud (VPC);
    deploying, via the computer processor, the set of forensic tools to an object storage;
    creating, via the computer processor, an encrypted volume to store the set of forensic tools from the object storage;
    identifying a victim instance;
    attaching, via the computer processor, a toolset volume, including the live response script, and an evidence volume to the victim instance;
    executing, via the computer processor, the live response script and storing artifacts to the evidence volume; and
    removing, via the computer processor, the evidence volume from the victim instance and attaching to a forensic analysis instance.

9. The method of claim 8, wherein the VPC is created by the computer processor by using a cloud infrastructure service API.

10. The method of claim 8, further comprising:
    receiving an alert for the victim instance from logging and monitoring components;
    gathering inventory metadata of the victim instance, the victim instance associated with the alert;
    applying network isolation to the victim instance;
    using a cloud infrastructure to create a forensic clean room;
    executing the live response script to image memory;
    collecting volatile data and executing malware detection;
    collecting one or more network capture files;
    performing a snapshot of system and data volumes;
    recreating victim volumes from the snapshot; and
    executing timeline, memory triage, information extractor, malware, and search tasks.

11. The method of claim 8, further comprising:
    monitoring the evidence volume;
    transferring the artifacts from completed tasks to an evidence volume completed directory;
    transferring an artifact archive to long term forensic evidence storage;

terminating forensics compute and instances and associated volumes and snapshots; and ingesting artifacts into a legacy forensic tool set.

12. The method of claim 8, further comprising:

attaching a collection script to the victim instance;

running the collection script;

archiving an output for a predetermined period of time;

recognizing an indication of compromise post-instance destruction; and initiating an investigation.

13. The method of claim 12, further comprising:

creating the evidence volume;

executing a timeline, a memory triage, an extractor, a malware, and a search task against volume snapshots; and moving live response artifacts to the evidence volume.

14. The method of claim 13, further comprising:

ingesting the live response artifacts into a search and visualization tool.

15. A non-transitory computer readable medium containing program instructions for causing a computer to perform a method that provides digital cloud forensics, the method comprising:

identifying, via a computer processor, a host operating system and an application architecture;

updating, via the computer processor, a set of forensic tools in a local repository, the set of forensic tools including at least one live response script;

creating, via the computer processor, a forensic Virtual Private Cloud (VPC);

deploying, via the computer processor, the set of forensic tools to an object storage; and creating, via the computer processor, an encrypted volume to store the set of forensic tools from the object storage;

identifying a victim instance;

attaching, via the computer processor, a toolset volume, including the live response script, and an evidence volume to the victim instance;

executing, via the computer processor, the live response script and storing artifacts to the evidence volume; and removing, via the computer processor, the evidence volume from the victim instance and attaching to a forensic analysis instance.

16. The non-transitory computer readable medium of claim 15, wherein the VPC is created by the computer processor by using a cloud infrastructure service API.

17. The non-transitory computer readable medium of claim 15, the method further comprising:

receiving an alert for the victim instance from logging and monitoring components;

gathering inventory metadata of the victim instance, the victim instance associated with the alert;

applying network isolation to the victim instance;

using a cloud infrastructure to create a forensic clean room;

executing the live response script to image memory;

collecting volatile data and executing malware detection;

collecting one or more network capture files;

performing a snapshot of system and data volumes;

recreating victim volumes from the snapshot; and executing timeline, memory triage, information extractor, malware, and search tasks.

18. The non-transitory computer readable medium of claim 15, the method further comprising:

monitoring the evidence volume;

transferring the artifacts from completed tasks to an evidence volume completed directory;

transferring an artifact archive to long term forensic evidence storage;

terminating forensics compute and instances and associated volumes and snapshots; and ingesting artifacts into a legacy forensic tool set.

19. The non-transitory computer readable medium of claim 15, the method further comprising:

attaching a collection script to the victim instance;

running the collection script;

archiving an output for a predetermined period of time;

recognizing an indication of compromise post-instance destruction; and initiating an investigation.

20. The non-transitory computer readable medium of claim 19, the method further comprising:

creating the evidence volume;

executing a timeline, a memory triage, an extractor, a malware, and a search task against volume snapshots;

moving live response artifacts to the evidence volume; and ingesting the live response artifacts into a search and visualization tool.

* * * * *